United States Patent
Linke et al.

(10) Patent No.: US 11,479,318 B2
(45) Date of Patent: Oct. 25, 2022

(54) BICYCLE OPERATING APPARATUS (71) Applicant: SRAM DEUTSCHLAND GmbH, Schweinfurt (DE)

(72) Inventors: Alexander Linke, Schonungen (DE); Wolfram Frank, Bamberg (DE); Thorsten Hamisch, Kuernach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 16/870,493

(22) Filed: May 8, 2020

(65) Prior Publication Data
US 2020/0354020 A1 Nov. 12, 2020

(51) Int. Cl.
| | |
|---|---|
| *B62J 45/20* | (2020.01) |
| *B62K 23/06* | (2006.01) |
| *B62L 3/02* | (2006.01) |
| *B62M 3/14* | (2006.01) |
| *B62M 25/08* | (2006.01) |
| *B62J 50/21* | (2020.01) |

(52) U.S. Cl.
CPC .............. *B62J 45/20* (2020.02); *B62J 50/225* (2020.02); *B62K 23/06* (2013.01); *B62L 3/02* (2013.01); *B62M 3/14* (2013.01); *B62M 25/08* (2013.01)

(58) Field of Classification Search
CPC .... B62M 25/08; B62M 25/04; B62M 25/045; B62M 3/14; B62K 23/06
See application file for complete search history.

(56) References Cited

U.S. PATENT DOCUMENTS

| | | | |
|---|---|---|---|
| 6,848,336 B2 * | 2/2005 | Shahana | B62M 25/04 74/489 |
| 8,297,143 B2 * | 10/2012 | Fujii | B62M 25/04 74/473.13 |
| 10,102,724 B2 | 10/2018 | Baumann et al. | |
| 10,370,056 B2 | 8/2019 | Komatsu et al. | |
| 2018/0037299 A1 | 2/2018 | Masciolini et al. | |
| 2018/0086412 A1 * | 3/2018 | Komatsu | B62K 21/12 |

FOREIGN PATENT DOCUMENTS

EP 3147194 3/2017

* cited by examiner

*Primary Examiner* — Thomas C Diaz (57) ABSTRACT

A bicycle operating apparatus for wirelessly controlling at least one component of a bicycle includes a carrier element on a fastening device for fixing the bicycle operating apparatus to a handlebar of the bicycle, a housing attachable to the carrier element having an energy storage compartment for receiving an energy storage element and having an electronic circuit arrangement in the housing. At least one switch is connected to the electronic circuit arrangement on the housing. An operating component mounted on the carrier element to be pivotable about an operating axis preloaded into a neutral position which is able to be deflected out of the neutral position in a first direction of rotation about the operating axis in order to actuate the switch, and the operating axis extends obliquely with respect to the flat outer surface.

19 Claims, 11 Drawing Sheets

BICYCLE OPERATING APPARATUS

PRIORITY

This application claims priority to, and/or the benefit of, German patent application DE 20 2019 102 653.7, filed on May 10, 2019, the contents of which are included by reference herein in their entirety.

BACKGROUND

A generic bicycle operating apparatus is known for example from the document EP 3147194 A1 and illustrated in FIGS. 24 to 26 therein.

The circuit arrangement, usually provided on a circuit board, and the energy storage element present, for example in the form of a button cell, frequently require that the housing have a flat, elongate, for example cuboidal shape, as is also provided in the abovementioned document, in which the housing is oriented substantially parallel to the operating axis and is arranged at the same height as the latter.

Against this background, the object of the present disclosure is to improve the generic bicycle operating apparatus in terms of a compromise between the accessibility of the operating component for the operator and a compact arrangement of the apparatus on the handlebar of the bicycle.

SUMMARY

According to one aspect, a bicycle operating apparatus for wirelessly controlling a component of the bicycle includes a carrier element on which a fastening device configured to fix the bicycle operating apparatus to a handlebar of the bicycle is attachable; a housing, attached to the carrier element, the housing having an energy storage compartment for receiving an energy storage element, the housing having an electronic circuit arrangement in the housing, where at least one switch connected to the electronic circuit arrangement is provided on the housing, and wherein the housing has at least one flat outer surface, which forms a lower or upper outer surface when the bicycle operating apparatus is in a state fitted properly on the handlebar; and an operating component mounted on the carrier element to be pivotable about an operating axis preloaded into a neutral position, and the operating component is deflected out of the neutral position in a first direction of rotation about the operating axis in order to actuate the switch, wherein the operating axis extends obliquely with respect to the flat outer surface.

BRIEF DESCRIPTION OF DRAWINGS

Other aspects and advantages of the embodiments disclosed herein will become apparent upon consideration of the following detailed description, where similar or identical structures have similar reference numerals.

DETAILED DESCRIPTION

The present disclosure relates to a bicycle operating apparatus for wirelessly controlling at least one component of a bicycle, comprising a carrier element, a housing and an operating component. A fastening device, such as a clamp, for fixing the bicycle operating apparatus to the handlebar of the bicycle is provided on or attachable to the carrier element. The housing provided on or attachable to the carrier element has an energy storage compartment for receiving an energy storage element. Accommodated in the housing is an electronic circuit arrangement, and provided on the housing is at least one switch connected to the electronic circuit arrangement. Furthermore, the housing has at least one flat outer surface, which forms a lower or upper outer surface when the bicycle operating apparatus is in a state fitted properly on the handlebar. The operating component is mounted on the carrier element to be pivotable about an operating axis and is preloaded into a neutral position. It may be deflected out of the neutral position in a first direction of rotation about the operating axis in order to actuate the switch.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

The object of the present disclosure is achieved by the operating axis extending obliquely with respect to the flat outer surface of the housing, i.e. neither parallel nor perpendicularly thereto.

The operating axis extends in this case obliquely with respect to a plurality of outer surfaces of the housing, to more than half of all the outer surfaces, or even to all the outer surfaces of the housing.

It is possible for the housing to comprise two flat outer surfaces that are substantially perpendicular to one another, where the operating axis extends obliquely with respect to these two outer surfaces. The specification "substantially perpendicular" is intended to include angular deviations of up to ±10°.

Where surfaces or surface portions are said to be arranged parallel or perpendicular or at a given angle to one another in this disclosure, this should be understood as meaning that the surfaces or surface portions are each flat or at least approximately flat, i.e. extend in or along an associated plane, and that the planes associated with the surfaces or surface portions are parallel to one another or perpendicular to one another or intersect one another at the given angle.

The carrier element and the housing may be configured as separate components. For example, the carrier element can be produced as an integral component from a metal, such as from aluminum.

According to an embodiment, the at least one lower or upper flat outer surface is part of a removable housing cover, which allows for example access to the electronic circuit arrangement. The housing is produced from plastic.

A space-saving and ergonomic arrangement of the individual constituents of the bicycle operating apparatus with respect to one another and to the handlebar of the bicycle can be achieved in that the flat outer surface has a longitudinal axis that extends in a skew manner and obliquely with respect to the operating axis, i.e. does not intersect the latter and is oriented neither parallel nor perpendicularly thereto.

Alternatively or additionally, it is possible for a clamp to be provided as fastening apparatus on the carrier element, said clamp defining a clamp axis, where the flat lower outer surface has a longitudinal axis, which extends in a skew manner and obliquely with respect to the clamp axis. In this case, the clamp axis is oriented parallel to the operating axis and extends at a distance therefrom.

In order for it to be possible to position the operating axis and thus the operating component as close as possible to the handlebar, it is possible for the housing to be located entirely on a side of an operating axis plane that is remote from the clamp axis. The operating axis plane contains the operating axis and extends perpendicularly to the plane that is defined by the operating axis and the clamp axis extending parallel to and at a distance from the latter, i.e. contains both the operating axis and the clamp axis.

If the housing is arranged lower down than the handlebar when the bicycle operating apparatus is in a properly fitted state, the housing is thus also positioned lower down than the operating axis.

According to an embodiment, the bicycle operating apparatus also comprises a brake operating device, which has a brake actuator housing and a brake lever provided in a pivotable manner on the brake actuator housing. The brake actuator housing is attachable to the handlebar of the bicycle, together with the carrier element, the housing and the operating component, either by way of the abovementioned fastening device (clamp) or a separate brake fastening device, such that the housing and the brake actuator housing are arranged in an aligned manner with one another at least in plan view from above or below.

It is possible to prevent the operating component from impeding brake actuation. Furthermore, it is protected from impacts in the event of a fall. In addition, a compact and aerodynamically favorable arrangement and an attractively "tidy" appearance of the bicycle operating apparatus are produced.

The housing can have an electronics portion and a switch portion. In this case, the energy storage element and the electronic circuit arrangement are accommodated in the electronics portion. The at least one switch is provided on or in the switch portion. Preferably, both the electronics portion and the switch portion each have two outer surface portions arranged substantially perpendicularly to one another, and the two outer surface portions, arranged substantially perpendicularly to one another, of the switch portion extend obliquely with respect to the two outer surface portions, arranged substantially perpendicularly to one another, of the electronics portion. As a result of such an angular arrangement of the electronics portion and the switch portion with respect to one another, a compact construction can be achieved.

In order to increase the number of operating options, it is possible for a further switch to be provided on the housing, said further switch being connected to the electronic circuit arrangement, where the operating component is able to be deflected out of the neutral position in a second direction of rotation, which is opposite to the first direction of rotation, about the operating axis in order to actuate the further switch. Thus, the operating component is in the form of a rocker switch that is preloaded into a neutral central position.

Generally, in the present application, the term "switch" denotes any kind of switching element, in particular switches proper, which open and close a circuit, buttons, which trigger a pulse in order to activate a circuit or process, and push switches, which are activated by being actuated and deactivated when released. The switch(es) is/are in the form of a push button.

Different functions or components of a bicycle can be controlled with the bicycle operating apparatus. For example, the actuation of one switch can effect shifting up of a rear derailleur by one gear stage, and the actuation of the further switch can effect shifting down of the rear derailleur by one gear stage. It is possible, for example using a suitable app, to assign the individual switches or switch actuations to the desired functions or components to be controlled by the switch actuations.

The operating component may have at least two thumb engagement surfaces and at least one finger engagement surface, which are each designed to be actuated by the thumb or by one of the other fingers, in particular the index finger, of an operator's hand. The two thumb engagement surfaces are in this case designed, when actuated properly, to deflect the operating component out of the neutral position in opposite directions of rotation. The two thumb engagement surfaces extend at an angle of 80 to 120 degrees to one another, particularly at an angle of around 90 degrees.

It is possible for the two thumb engagement surfaces to form parts of a scoop-like depression for the operator's thumb, in which their thumb can rest while cycling.

For operation using the rider's index finger bend, the finger engagement surface may be convexly curved perpendicularly to the operating axis. This allows actuation in which the grip around the handlebar is loosened as little as possible.

In order to adapt the configuration of the bicycle operating apparatus to the different anatomical conditions and preferences of different operators, a linear guide may be provided on the carrier element. The fastening device is attachable to the linear guide to be adjustable in different fastening positions that lie on a guiding line. The guiding line extends parallel to the operating axis and/or clamp axis.

The linear guide of the carrier element and the fastening device may be configured to fasten the fastening device to the linear guide in two or more discrete fastening positions along the guiding line or stepless linear adjustment of the fastening device on the linear guide is possible, for instance by clamping to a rail.

According to an embodiment, the orthogonal projection of the operating axis onto the upper or lower flat outer surface of the housing may intersect a longitudinal center axis of this flat outer surface at an angle $\alpha$ of between 20° and 45°, preferably between 25° and 35°, and particularly preferably around 30°.

In a corresponding manner, the orthogonal projection of the operating axis onto a lateral outer surface of the housing that extends perpendicularly to the upper or lower flat outer surface may intersect a center axis of the lateral outer surface that extends likewise perpendicularly to the upper or lower flat outer surface at an angle $\beta$ of between 20° and 45°, preferably between 25° and 35°, and particularly preferably around 30°.

As previously mentioned, the housing is oriented obliquely with respect to the operating axis and/or clamp axis in two mutually perpendicular spatial directions.

It is noted that the figures are simplified and schematic illustrations that are intended to illustrate mainly the principle of the disclosure. In order not to clutter the figures, reference signs are not always provided for all of the features in each illustration, but rather primarily only for those features that are required for explaining the respective figures.

Figure 1:
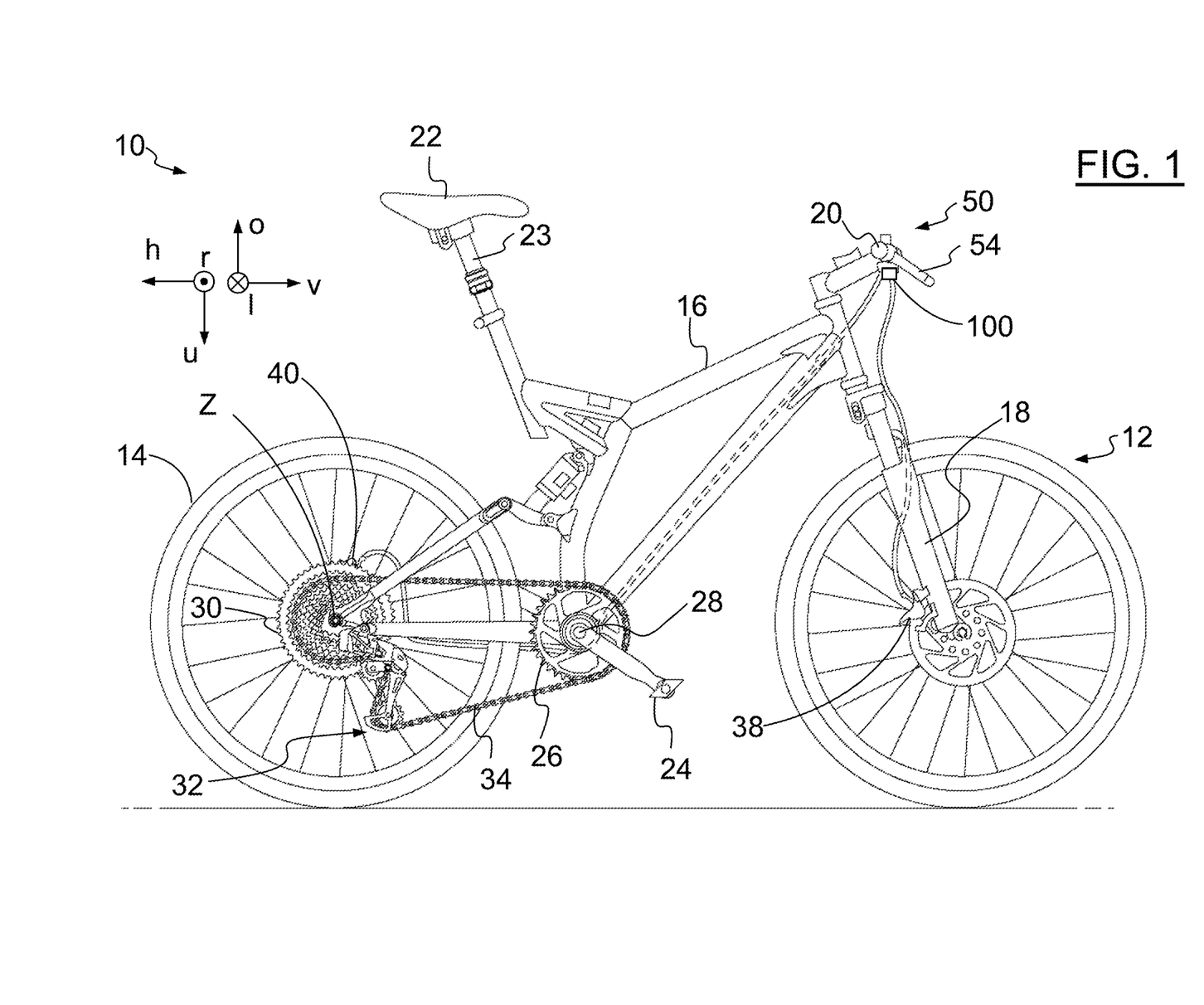
FIG. 1 shows a side view of a bicycle having bicycle operating apparatuses according to respective first and second exemplary embodiments of the present disclosure.

Unless explicitly stated otherwise, directional terms such as front, rear, top, bottom, left and right relate, in the present application, to the directions indicated in FIG. 1 by arrows v, h, o, u, l and r, as arise for a rider who is sitting in a normal manner on a bicycle that is equipped with the bicycle operating apparatus and is standing or travelling on a horizontal underlying surface.

A bicycle denoted 10 overall in FIG. 1 has, in a known manner, a front wheel 12, a rear wheel 14 and a frame 16. The front wheel 12 is mounted in a rotatable manner at bottom ends of a front-wheel fork 18, which is held on the frame 16 in a rotatable manner at its upper end and carries a handlebar 20 for steering the bicycle 10. The rear wheel 14 is mounted to be rotatable about a wheel axis Z at a rear end of the frame 16.

The frame 16 also carries a seat 22 and a crank assembly with pedal cranks 24 and a front chain wheel 26 fastened thereto. The crank assembly is fitted on the frame 16 to be rotatable about a pedal-crank bearing axle 28. Fitted on the rear wheel 14, concentrically with the wheel axis Z, is a pinion assembly 30 that carries a plurality of pinions of different diameters, i.e. with different numbers of teeth. In the exemplary embodiment, a pinion assembly with a total of twelve pinions is provided, and the front chain wheel 26 is provided as a single wheel, such that a total of twelve shift stages are settable. Within the scope of the disclosure, other shift configurations can of course be used, in particular including multiple chain wheels, between which it is possible to shift by a front derailleur.

In order to set the shift stages of the rear pinion assembly 30, use is made of a rear derailleur system having a rear derailleur 32, which is fastened to a rear end of the frame 16 and forms part of an actuating device. A chain 34 runs around the pinion assembly 30 and the front chain wheel 26 and passes through the rear derailleur 32 in order to transmit driving force from the front chain wheel 26 to the pinion assembly 30 and thus to the rear wheel 14. The rear derailleur 32 is in this case capable of adjusting the chain 34 in an axial direction with respect to the axis of rotation Z of the rear wheel 14, in order to align the chain 34 selectively with one of the pinions of the pinion assembly 30 and accordingly to guide it onto the selected pinion.

In order for a rider to set the rear derailleur 32 into a desired shift stage, a bicycle operating apparatus 100 (illustrated only schematically in FIG. 1) according to a first exemplary embodiment is provided on the handlebar 20 on the right-hand side from the rider's point of view. The bicycle operating apparatus 100 transmits operating commands for controlling the rear derailleur 32 wirelessly via a radio connection between a radio transmitter integrated in the bicycle operating apparatus 100 and a radio receiver integrated in the rear derailleur 32.

Alternatively, however, other variants are conceivable and usable in the scope of the present disclosure in order to transmit operating commands by the rider from the bicycle operating apparatus 100 to a component of the bicycle, for example in order to set a suspension fork, damping or the height of a seat post 23.

In addition, the bicycle includes a brake system, for example in the form of a front disc brake 38 and/or a rear disc brake 40. For operating the brake system, at least one brake operating device 50 having a manual brake lever 54 is provided.

Figure 2A:
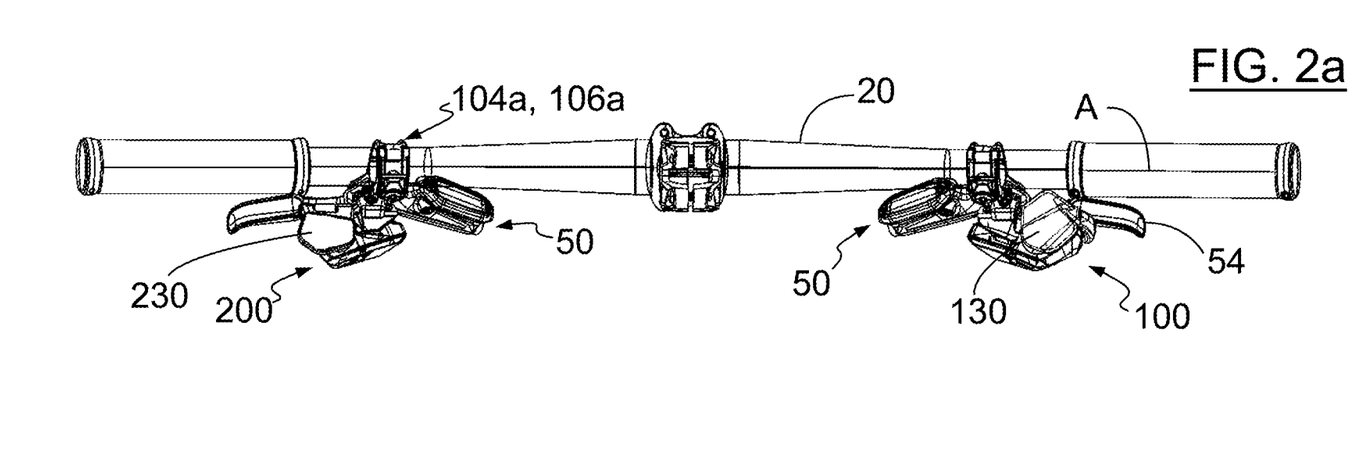
FIG. 2a shows a perspective rear view of the handlebar of the bicycle from FIG. 1 with the bicycle operating apparatuses provided thereon.
Figures 10A, 10B, 10C, 10D:
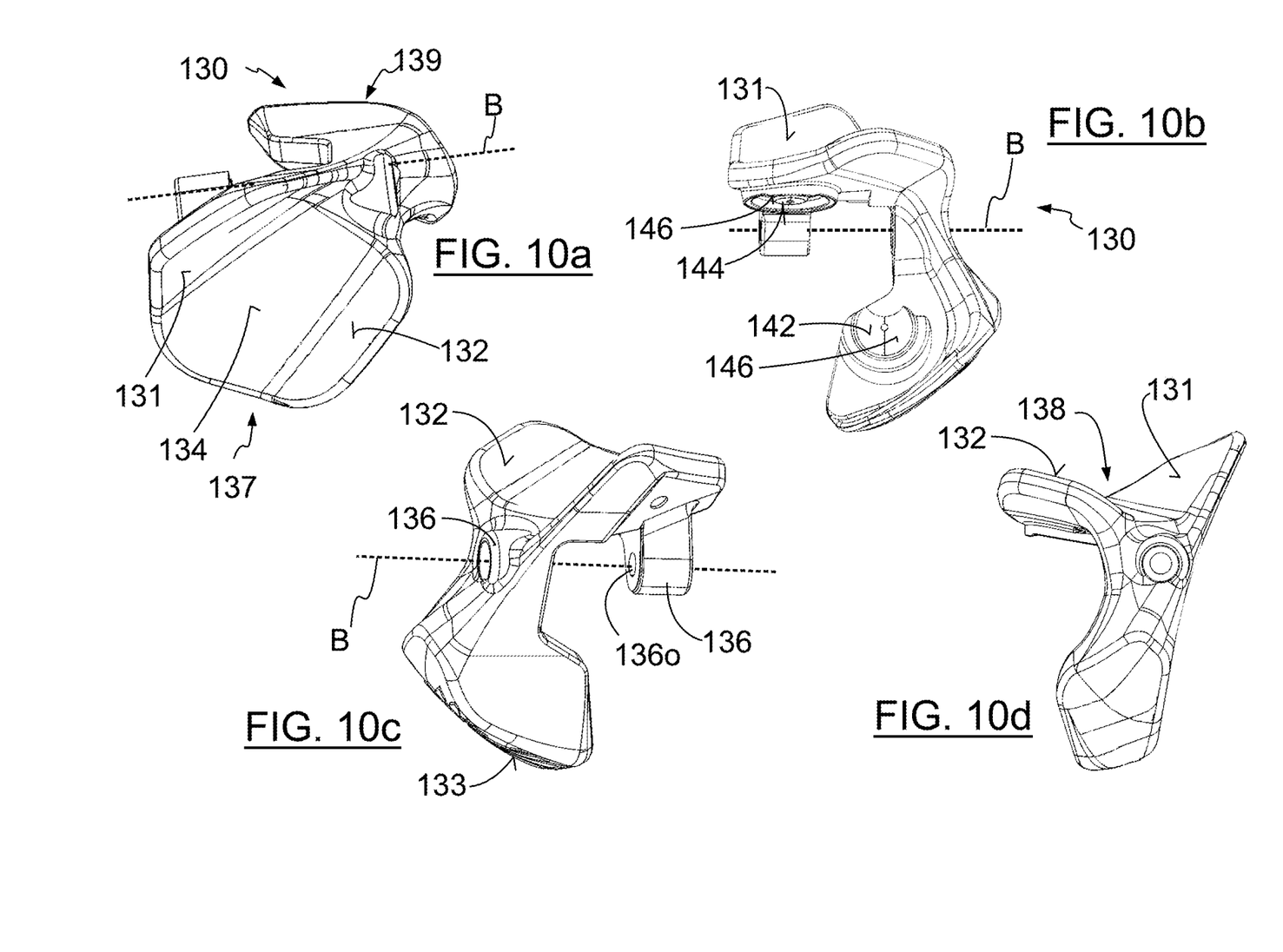
FIGS. 10a-10d show different perspective views of the operating component of the bicycle operating apparatus according to FIG. 3.
Figures 11A, 11B, 11C:
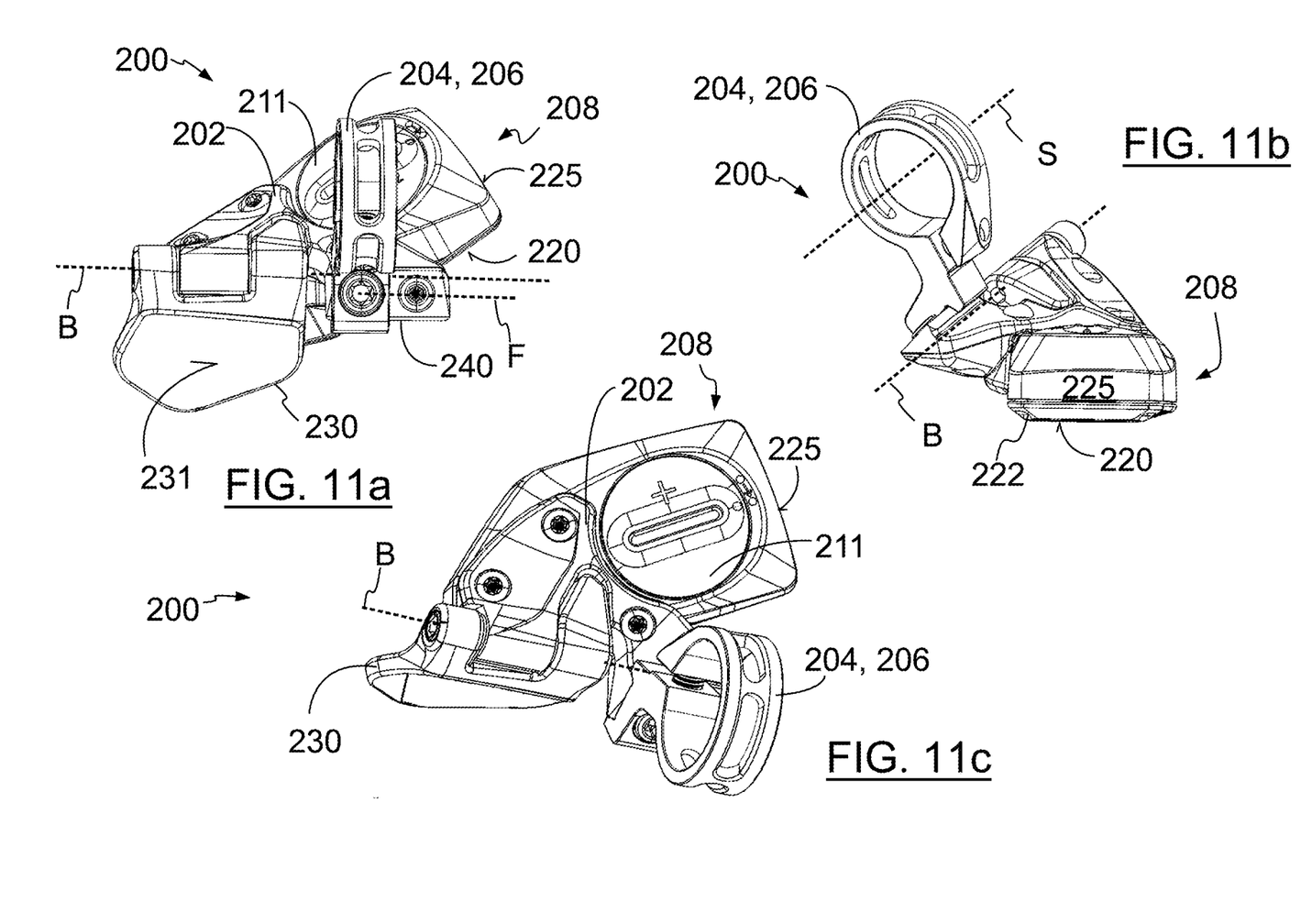
FIGS. 11a-11c show different perspective views of the second exemplary embodiment of the bicycle operating apparatus of the present disclosure.

FIG. 2a shows a view of the handlebar 20 of the bicycle 10 from FIG. 1 with the bicycle operating apparatuses 100 and 200 provided thereon, as seen from the rear. A bicycle operating apparatus 100 according to a first exemplary embodiment, which is described in more detail below with reference to FIGS. 3 to 10d, is provided on the right-hand side of the handlebar 20. A bicycle operating apparatus 200 according to a second exemplary embodiment, which is described in more detail below with reference to FIGS. 11a-11c, is provided on the left-hand side.

In the present example, the right-hand bicycle operating apparatus 100 is used to control the rear derailleur 32, while the left-hand bicycle operating apparatus 200 is used to control an adjustment of the seat post 23. For example, upon actuation of the first switch 112 of the right-hand bicycle operating apparatus 100, it is possible to shift up one gear stage, and upon actuation of the second switch 114, it is possible to shift down one gear stage.

It is noted that, instead of the left-hand bicycle operating apparatus 200, it is also possible to use a bicycle operating apparatus that corresponds in terms of structure and form to the bicycle operating apparatus 100 and is constructed merely mirror-symmetrically thereto, i.e. has in particular two switches. Using such a modified bicycle operating apparatus, an additional component could then be controlled, for example an adjusting device for the suspension fork or damping, or an additional function of the same component could also be controlled.

Figure 2B:
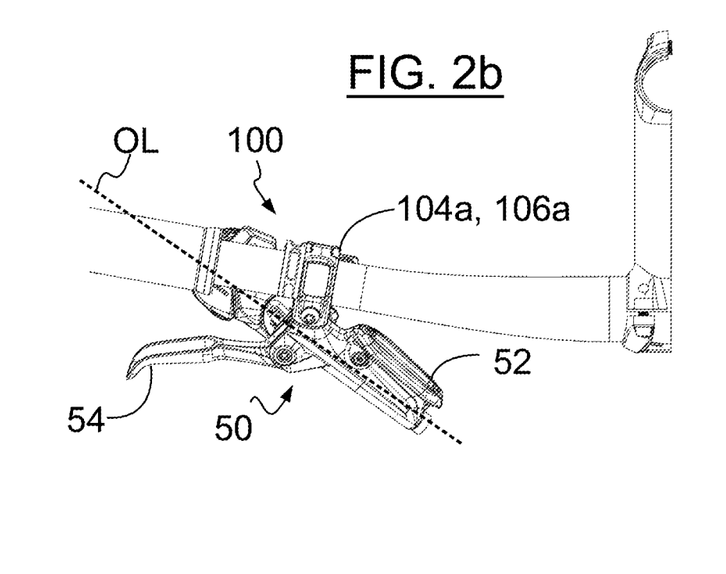
FIG. 2b shows a plan view from above of a part of the handlebar with the bicycle operating apparatus according to the first exemplary embodiment.
Figure 2C:
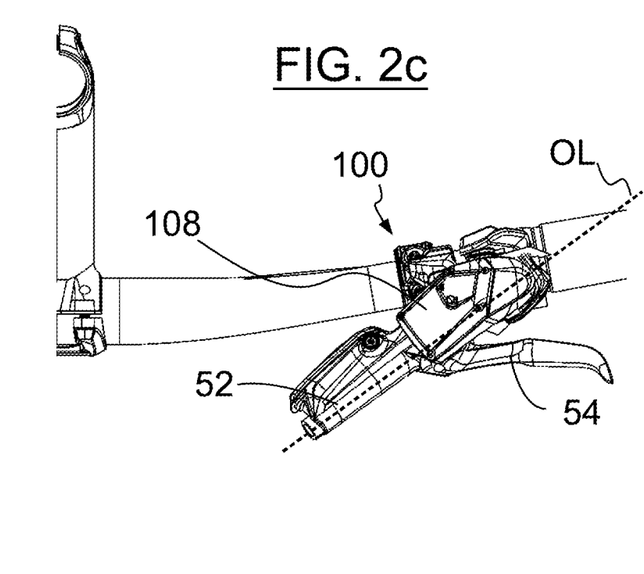
FIG. 2c shows the subject matter of FIG. 2b in a plan view from below.

As FIGS. 2b and 2c show in more detail, the bicycle operating apparatus can also comprise a brake operating device 50, which has a brake actuator housing 52 and a brake lever 54 provided in a pivotable manner on the brake actuator housing 52. The brake actuator housing 52 and a housing 108, described in more detail below, of the bicycle operating apparatus 100 can be arranged in an aligned manner along an orientation line OL at least in a plan view from above (cf. FIG. 2b) or from below (cf. FIG. 2c).

In addition, in FIGS. 2a, 2b, and 2c the brake operating device 100 is fixed to the handlebar 20 by the same clamp 106a as fastening device 104a as the bicycle operating apparatus 100. The bicycle operating device 100 can be provided on the clamp 106a so as to be adjustable both in a given angular range in the circumferential direction about the clamp axis S and in a linear manner parallel to the clamp axis S by a suitable adapter piece.

In the remaining figures, a simpler clamp 106 is illustrated as fastening device 104, which is formed separately from the clamp of a brake operating device.

Figure 3:
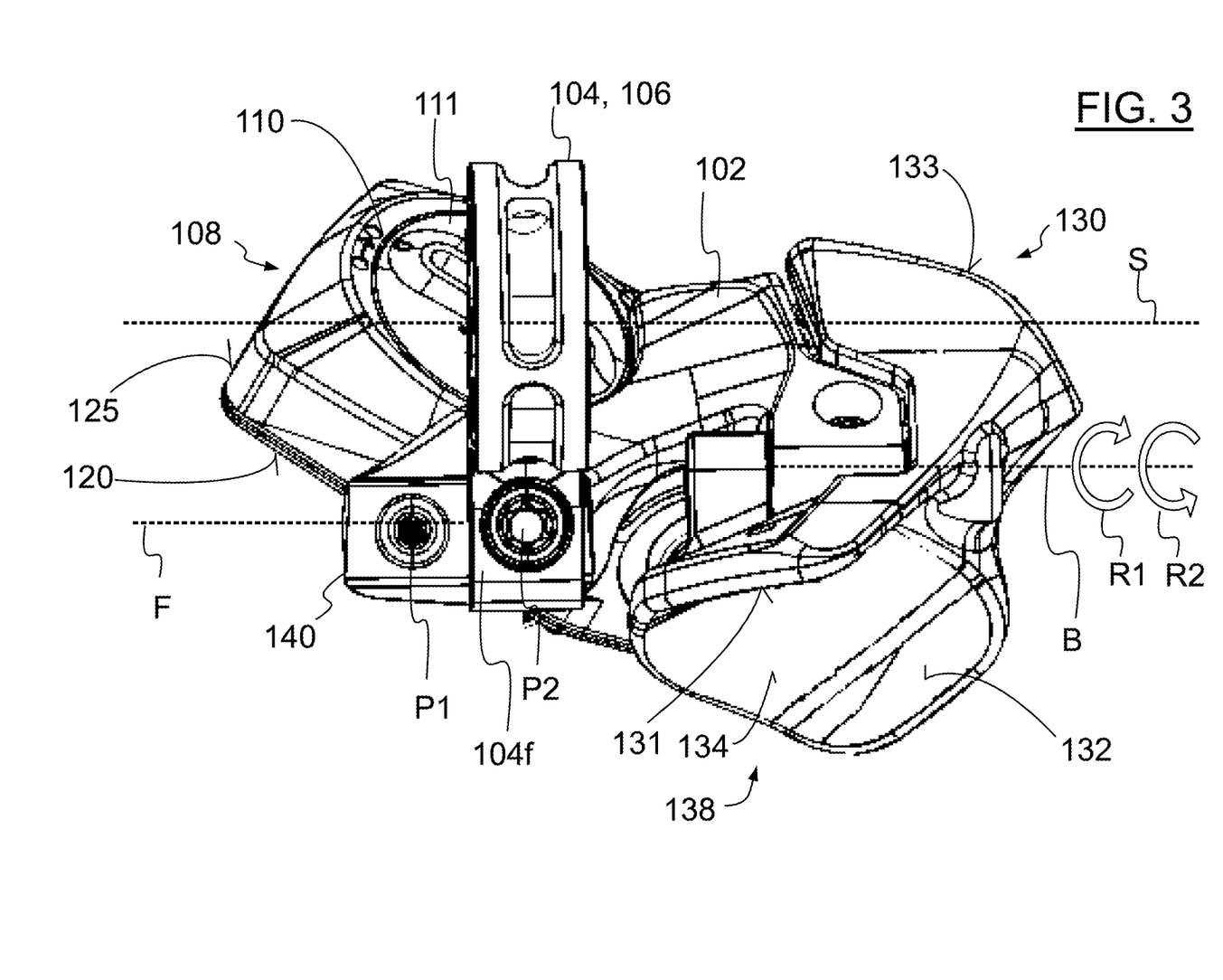
FIG. 3 shows a perspective illustration of the first exemplary embodiment without the handlebar and the brake operating device.

FIG. 3 shows the bicycle operating apparatus 100 of the first exemplary embodiment in a perspective illustration without the handlebar and the brake operating device, approximately at the viewing angle at which it is also seen by the rider (the operator) sitting on the bicycle.

As FIG. 3 shows, the bicycle operating apparatus 100 comprises a carrier element 102, on which a fastening device 104, in this case in the form of a clamp 106, is provided in order to attach the bicycle operating apparatus 100 to the handlebar 20 of the bicycle 10. The clamping axis S coincides, in the state fitted on the handlebar, substantially with the handlebar axis A (cf. FIG. 2a).

Figure 7A:
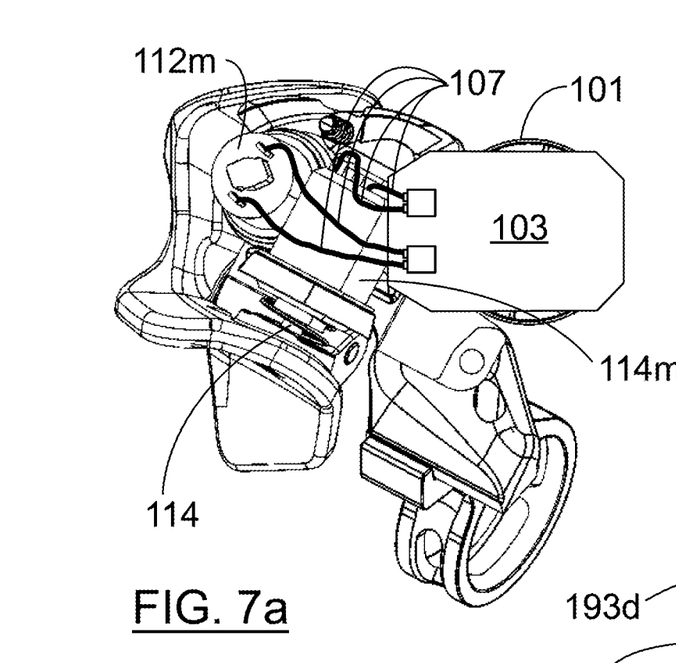
FIG. 7a shows a view obliquely from below of the subject matter in FIG. 3 without the housing.
Figure 7B:
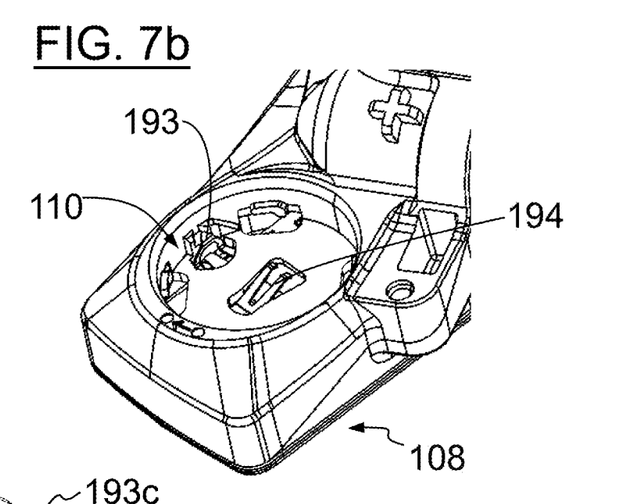
FIG. 7b shows a perspective view of a part of the housing of the bicycle operating apparatus from FIG. 3 without the cover of the energy storage compartment and without the energy storage element.
Figure 7C:
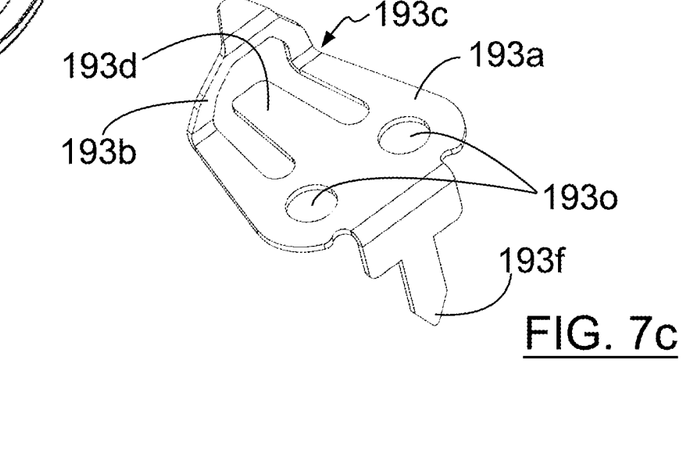
FIG. 7c shows a perspective and enlarged view of a contact spring inserted in the bicycle operating apparatus from FIG. 3.

Furthermore a housing 108 is fastened to the carrier element 102, said housing 108 accommodating, in an energy storage compartment 110, which is closed by a cover 111, an energy storage element 101, which is not visible here, in the form of a button cell, and also accommodating an electronic circuit arrangement 103, which is likewise not visible here (cf. FIGS. 7a-7c).

Figure 5A:
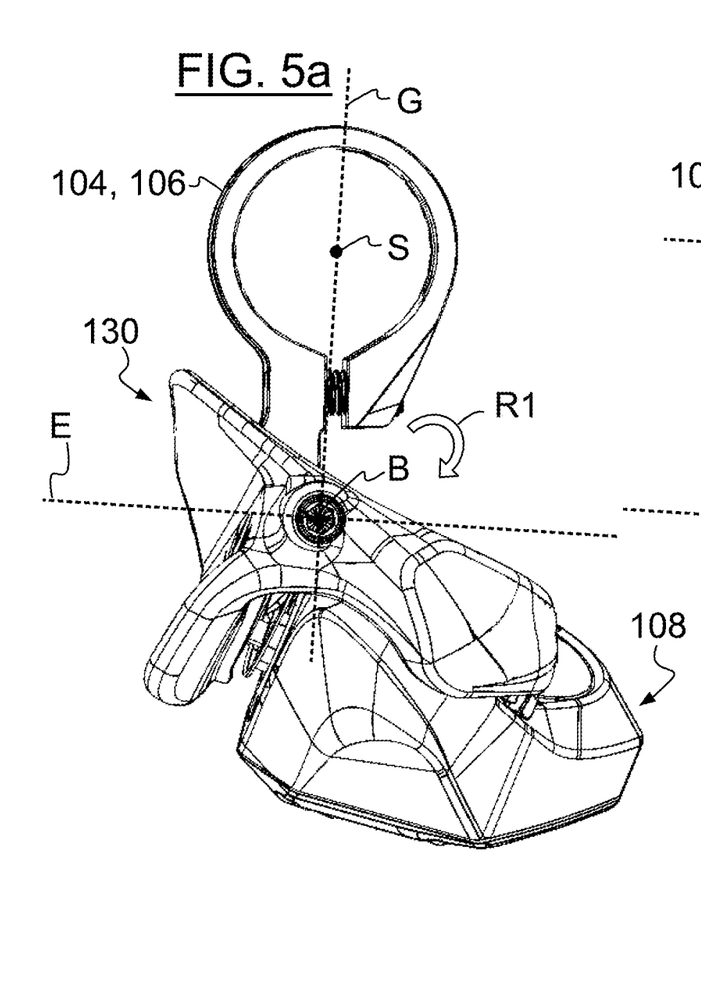
FIGS. 5a and 5b show the exemplary embodiment and, respectively, essential constituents of the exemplary embodiment from FIG. 3 in a view along the operating axis.
Figure 5B:
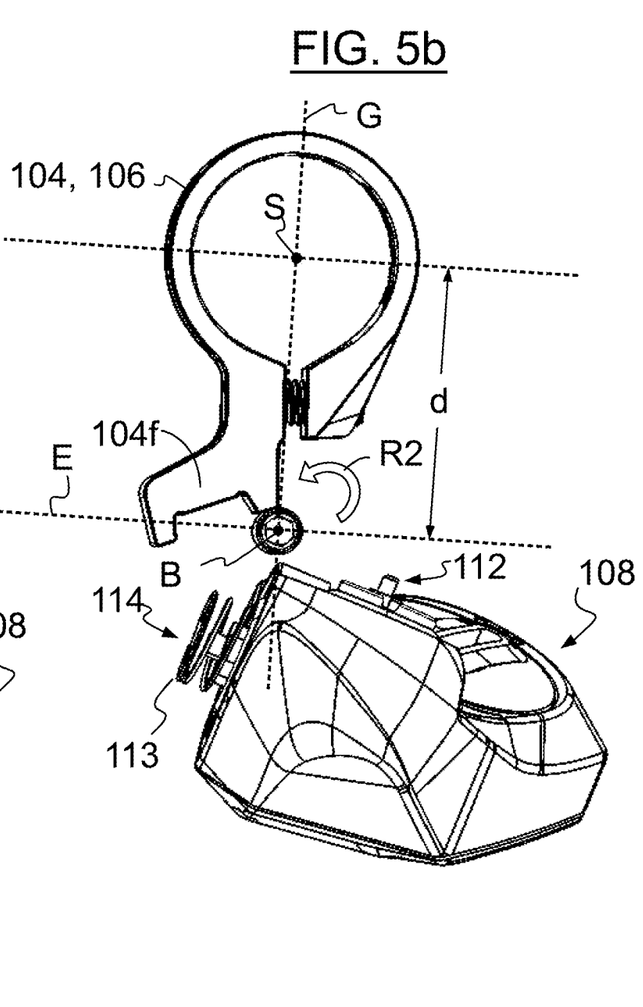

Also provided on the housing 108 are two switches 112 and 114, which are connected to the electronic circuit arrangement, which can be seen better in particular in FIG. 5b, and which may be for example push buttons or snap-action switches.

Finally, an operating component 130 is mounted on the carrier element 102 to be pivotable about an operating axis B and is preloaded into the neutral position illustrated in FIGS. 3 and 5a.

From this neutral position, the operating component 130 is able to be deflected about the operating axis B in a first direction of rotation R1 in order to actuate the first switch 112, and the operating component 130 is able to be deflected out of the neutral position about the operating axis B in a second direction of rotation R2, which is opposite to the first direction of rotation R1, in order to actuate the second switch 114.

In the present exemplary embodiment, the fastening device 106 may be fastenable in two different fastening positions P1, P2 on a linear guide 140 of the carrier element 102, where the different fastening positions P1, P2 lie on a guiding line F.

Furthermore, it is possible for the operating axis B, the clamp axis S defined by the clamp 106, and the guiding line F to extend substantially parallel to one another.

An advantage of the present disclosure resides in the favorable spatial arrangement of the housing 108 relative to the other constituents of the bicycle operating apparatus 100 and to the handlebar 20.

Specifically, the housing 108 is arranged obliquely with respect to the operating axis B (and thus preferably to the clamp axis S) inasmuch as it has at least one flat outer surface 120, which forms an upper or lower outer surface (in this case a lower outer surface) in the state fitted properly on the bicycle, and which is arranged such that the operating axis B extends obliquely with respect to this flat outer surface 120.

The flat outer surface 120 is in this case part of a removable lower housing cover 122, which allows for example access to the electronic circuit arrangement, for instance for maintenance or repair purposes.

The operating axis B also extends obliquely with respect to a lateral flat outer surface 125 of the housing, which is arranged substantially perpendicularly to the lower outer surface 120.

On account of the oblique arrangement of the housing 108, the latter can be provided in a compact manner on the handlebar 20, while, at the same time, the operating component 130 can be positioned as close as possible to the handlebar 20 in order to allow operation in which the operator has to loosen their grip around the handlebar 20 as little as possible.

Figure 4:
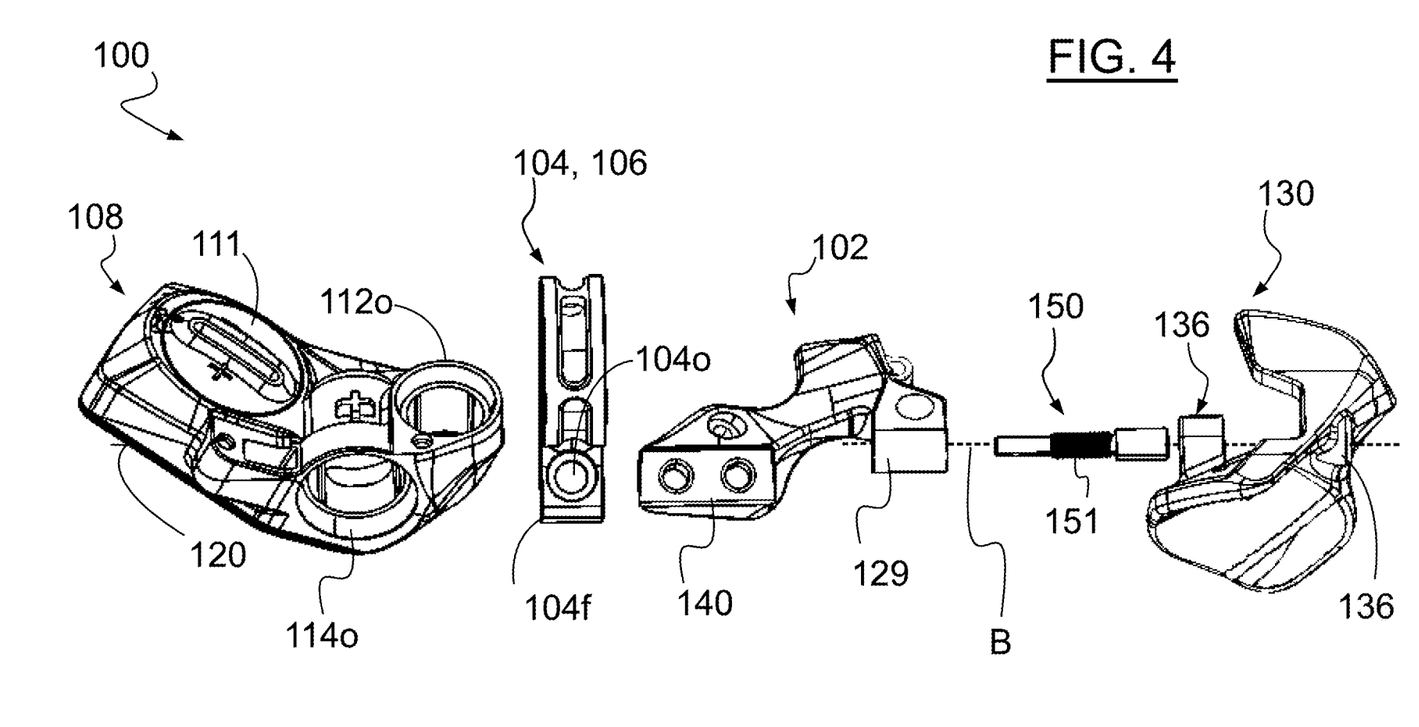
FIG. 4 shows an exploded illustration of essential constituents of the exemplary embodiment from FIG. 3.

FIG. 4 shows an exploded illustration of essential constituents of the bicycle operating apparatus 100 according to the disclosure, in particular of the housing 108, the clamp 106, the carrier element 102, a pivot pin 150 for rotatably mounting the operating component 130, and the abovementioned operating component 130, where the individual constituents are each illustrated in a manner offset with respect to one another along the operating axis B. In order not to clutter FIG. 4, no illustration has been given of the switches, the electronics, the fastening elements etc.

In order to fit the operating component 130 on the carrier component 102, a bearing portion 129, provided for this purpose, of the carrier component 102 can be positioned between two bearing portions 136 of the operating component 130 such that the through-openings provided in the respective bearing portions are arranged in an aligned manner, and then the pivot pin 150 is inserted or screwed in through the through-openings.

As FIGS. 5a and 5b illustrate, in contrast to the bicycle operating apparatus known for example from EP 3147194 A1, in the exemplary embodiment of the present disclosure, the housing 108 is not arranged at the same height as the operating axis B but entirely on that side of an operating axis plane E that is remote from the clamp axis S.

The operating axis plane E in this case contains the operating axis B and extends perpendicularly to a plane G defined by the operating axis B and the clamp axis S extending at the distance d therefrom. In the illustrations of FIGS. 5a and 5b, the operating axis plane E (and also the plane G) extends perpendicularly to the plane of the drawing.

In this sense, the housing 108, usually positioned beneath the handlebar 20, is arranged lower down, when the bicycle operating apparatus is in the state fitted on the handlebar, than the operating axis B, thereby making it possible to bring the operating axis B and thus also the operating component 130 closer to the handlebar 20. The distance of the housing 108 from the clamp axis S is thus greater than the distance d of the operating axis B from the clamp axis S.

FIGS. 5a and 5b each show views as seen along the operating axis B, where FIG. 5b differs from FIG. 5a only in that, in FIG. 5b, the operating component 130 has been omitted, thereby making it possible to see the two switches 112 and 114 and a spring element 113 that preloads the operating component 130 away from the second switch 114 into the neutral position. A corresponding spring element can also be provided for the first switch 112. In particular, the two switches 112 and 114 are arranged at an angle of 80° to 100° to one another, particularly preferably around 90°.

Figure 6A:
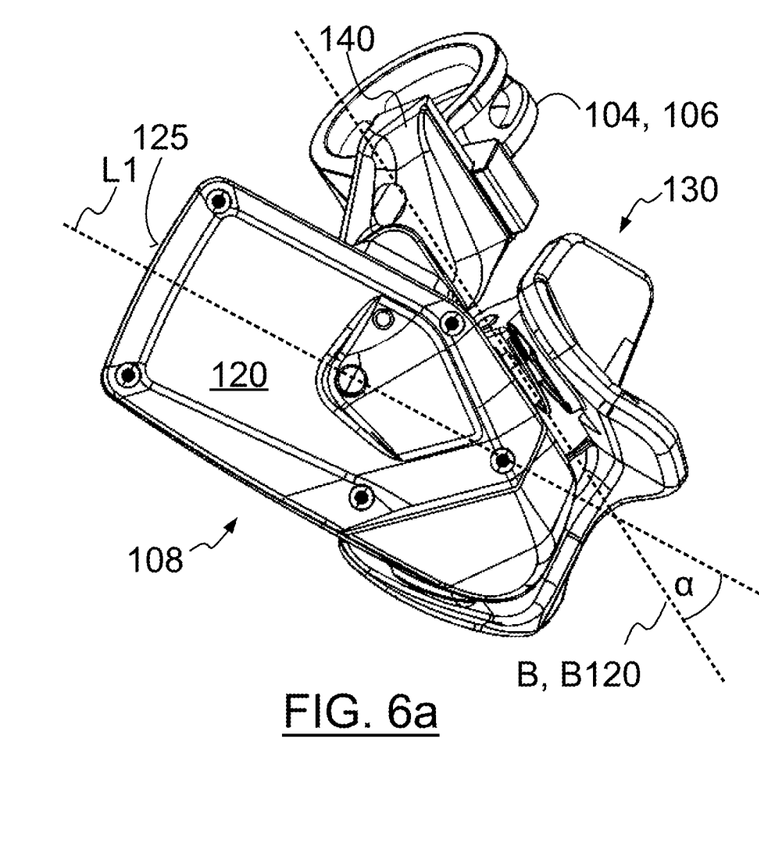
FIGS. 6a and 6b show the subject matter of FIG. 3 for the one part in a plan view of the lower flat outer surface of the housing and for the other part in a plan view of a lateral outer surface of the housing.
Figure 6B:
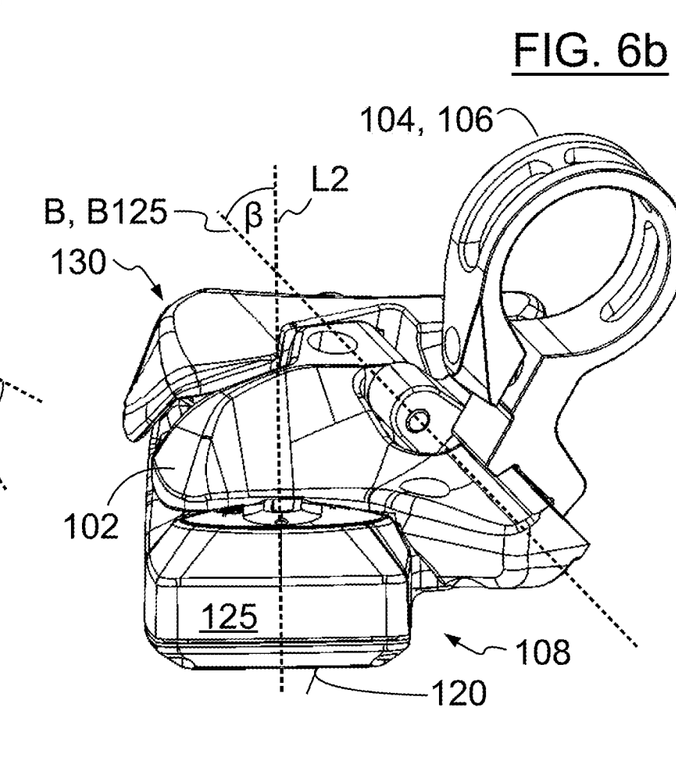

The two plan views of the lower outer surface 120 in FIG. 6a and of the lateral outer surface 125 of the housing 108 in FIG. 6b illustrate the oblique position of the housing 108 in somewhat more detail.

As the figures show, the orthogonal projection B120 of the operating axis B onto the lower outer surface 120 intersects a longitudinal center axis L1 of the outer surface 120 at an angle α of between 25° and 35° and preferably around 30°. Furthermore, the orthogonal projection B125 of the operating axis B onto the lateral (short) outer surface 125 intersects a center axis L2 of this lateral outer surface 125, which extends substantially perpendicularly to the lower outer surface 120, at an angle β of likewise between 25° and 35° and preferably around 30°.

FIG. 7a shows parts of the subject matter of FIG. 3 in a view that corresponds to a plan view of the lower outer surface of the housing, although the housing itself is not illustrated, in order to make it possible to see the electronic circuit arrangement 103 and the energy storage element 101 in the form of a button cell.

The electronic circuit arrangement 103, illustrated in a schematic and simplified manner, is connected to the switches 112, 114, or switch modules 112m, 114m via lines 107 that are only indicated here, and comprises electronics for generating a signal on the basis of the position and/or actuation of the switches 112 and 114, and preferably a radio antenna (not illustrated here) in order to transmit the generated signals to the component of the bicycle 10 that is to be controlled in each case.

The circuit arrangement 103 is connected to the button cell, as energy storage element 101, preferably via contact springs 193 and 194 that are at least partially visible in FIG. 7b.

The contact spring 193 that is illustrated in an enlarged and perspective manner in FIG. 7c is formed integrally from metal and comprises a first spring leg 193a, which is oriented parallel to the flat outer surfaces of the button cell in the installed state, and a second spring leg 193b, which bears regionally against the side of the button cell in the installed state. A bend 193c through somewhat more than 90 degrees in the unloaded state connects the spring legs 193a and 193b.

In the installed state, a tongue 193d butts against a surface of the housing 108 and thus helps to orient the contact spring 193 in the housing 108. Furthermore, it is used in the functional test of the circuit board, when a spring contact pin is placed thereon for testing.

Two through-openings 193o formed in the first spring leg 193a serve for fastening in the housing 108. For this purpose, two pegs (not illustrated here) engage through the through-openings 193o and are fused.

Finally, a soldering pin 193e of the contact spring 193, said soldering pin 193e protruding from the first spring leg 193a approximately perpendicularly in the opposite direction to the second spring leg 193b, serves to establish a connection to the electronic circuit arrangement 103.

In the following text, individual components of the exemplary embodiment, illustrated in FIG. 3, of a bicycle operating apparatus 100 according to the disclosure are described in more detail with reference to FIGS. 8a to 10d.

Figures 8A, 8B, 8C:
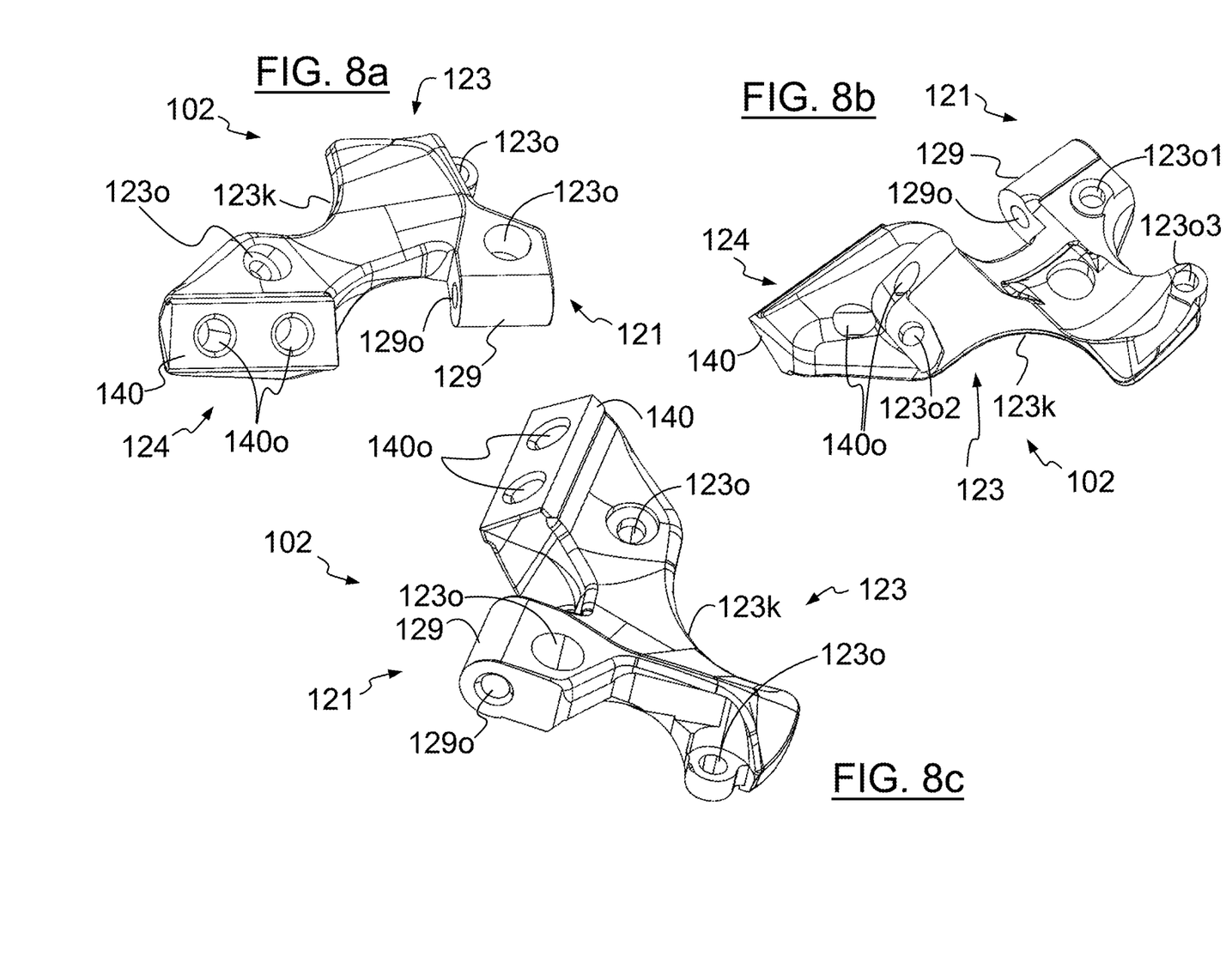
FIGS. 8a-8c shows different perspective views of the carrier element of the bicycle operating apparatus from FIG. 3.

The carrier element 102 illustrated in FIGS. 8a-8c in different views from different viewing angles is formed in one piece in the present case, from a metal, for example from aluminum.

It has an operating component fastening portion 121, a clamp fastening portion 124 and a housing fastening portion 123.

A linear guide 140 is provided on the clamp fastening portion 124. The linear guide 140 is configured in the form of an elongate rail with two fastening openings 140o, which define the two fastening positions P1 and P2 for fastening the clamp 106 to the carrier element 102. In a corresponding manner, the fastening device 104 (clamp 106) has a guide portion 104f in the form of a U profile (cf. FIG. 5b), which is configured to engage over the rail of the linear guide 140, and a fastening opening 104o (cf. FIG. 4).

The operating component fastening portion 121 of the carrier element 102 comprises a bearing portion 129 with a through-opening 129o, into which the pivot pin 150 is inserted, and which thus defines the position of the operating axis B on the carrier element 102. The through-opening 129o has an internal thread, into which an external threaded portion 151 of the pivot pin 150 (cf. FIG. 4) can be screwed.

In the housing fastening portion 123, three fastening openings 123o are provided, at which the carrier element 102 can be fixed to the housing 108 by way of appropriate fastening elements.

In order to achieve stable fastening, taking into account the forces that act on the apparatus when the switches are actuated, of the three fastening openings 123o a first one 123o1 (cf. FIG. 8b) is located in the vicinity of the operating component fastening portion 121, a second one 123o2 is located in the vicinity of the clamp fastening portion 124, and a third one 123o3 is located at a distance from the connecting straight line through the first and the second fastening opening 123o1, 123o2.

In order to ensure stable fastening of the housing 108 with easy access to the energy storage compartment 110, the housing fastening portion 123 also has, in the region in which it adjoins the energy storage compartment 110 in the fitted state, an edge 123k that follows the (circular) contour of the energy storage compartment cover 111.

The housing 108 illustrated in different perspective views in FIGS. 9a-9f is formed in a multipart manner with a housing body 109 and a removable lower housing cover 122, where the housing cover 122 has the lower flat outer surface 120 in the present case.

Figure 9A:
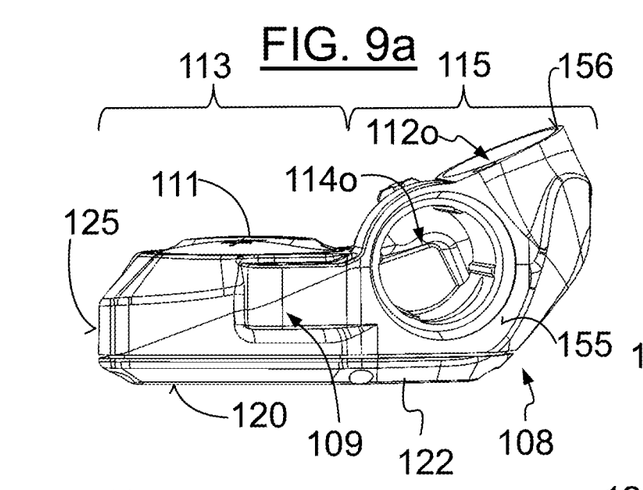
FIGS. 9a-9f show different perspective views of the housing of the bicycle operating apparatus from FIG. 3.

The housing 108 comprises an electronics portion 113 and a switch portion 115 (cf. FIG. 9a).

Accommodated in the electronics portion 113, having the basic shape of a flat cuboid, are the energy storage element in the form of a button cell, in an energy storage compartment 110, and the electronic circuit arrangement (cf. FIGS. 7a-7c). The five outer surfaces of the electronics portion are all flat in first approximation and all extend obliquely with respect to the operating axis B.

It is possible access the button cell after removal of a cover 111 provided on an upper outer surface of the housing 108, and it is possible to access the circuit arrangement 103 after removal of the lower housing cover 122 and possibly a further separating plate.

Figure 9B:
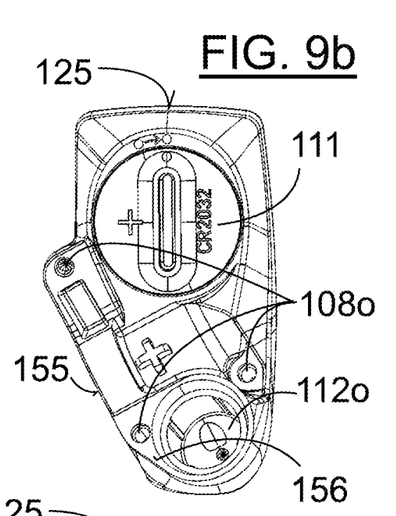
Figure 9C:
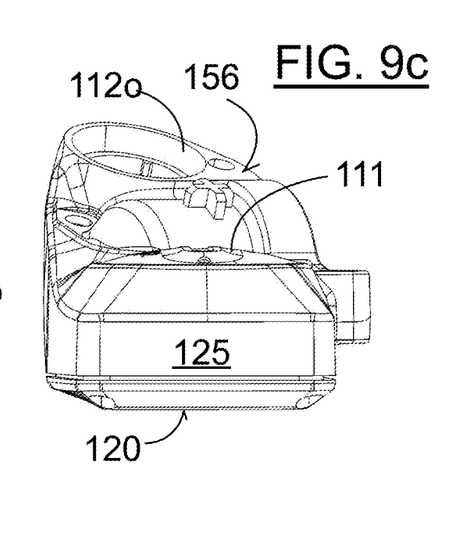
Figure 9D:
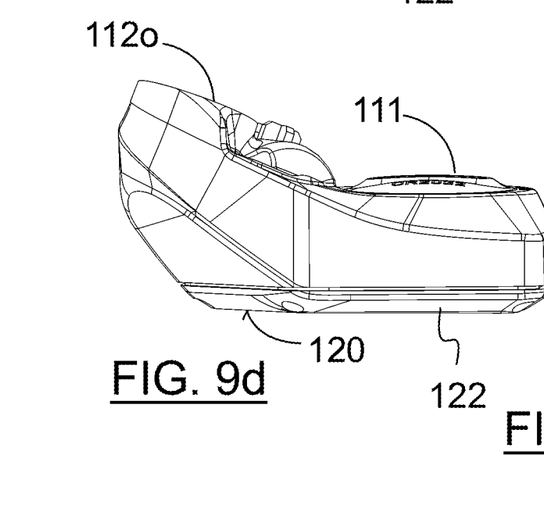
Figure 9E:
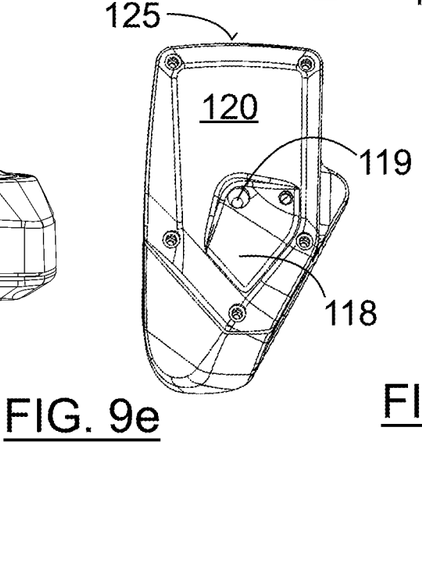
Figure 9F:
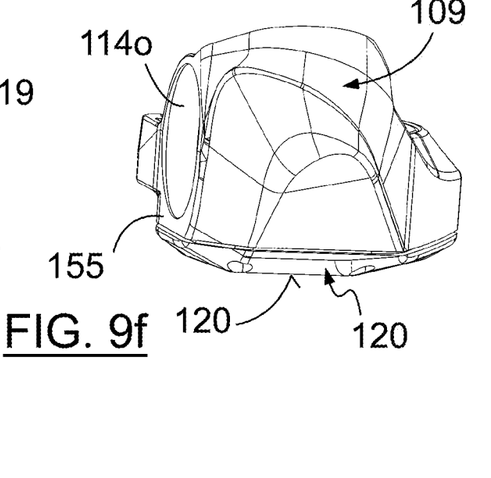

Furthermore, a switch 119 can be provided on the underside of the lower housing cover 122, preferably in a set-back portion 118, said switch 119 serving for example, when the bicycle operating apparatus is put into operation, to pair the bicycle operating apparatus 100 with the component to be controlled thereby (cf. FIG. 9e). Alternatively or additionally, some other mode or some other function of the bicycle operating apparatus 100 could also be selected with this switch. Upon pairing with a rear derailleur, switching for example between a "coarse adjustment" mode and a "fine adjustment" mode could be effected, where, in the "coarse adjustment" mode, switching between adjacent shift stages is effected by actuating the switches 112, 114, while, in the "fine adjustment" mode, switching between different (tuning) settings of the same shift stage is effected. In principle, the switch 119 is designed to effect pre-setting before the start of a journey.

The switch portion 115 of the housing 108 has round receiving openings 112o and 114o, which serve to receive cylindrical switch modules 112m and 114m (cf. FIG. 7a) with the switches 112 and 114, which are not illustrated in FIGS. 9a-9f.

Located only in the region of the switch portion 115 in the present exemplary embodiment are outer surface portions 155, 156 of the housing 108 that are not oriented obliquely but approximately parallel to the operating axis B when the housing 108 is fastened to the carrier element 102. In the outer surface portions 155 and 156 that are illustrated in FIGS. 9a and 9b, the receiving openings 112o and 114o, respectively, are provided in this case.

The outer surface portions 155, 156 in the switch portion 115, which are arranged substantially perpendicularly to one another, are each arranged obliquely with respect to the flat lower outer surface 120 and to the lateral outer surface 125 in the electronics portion 113. In this sense, the switch portion 115 is arranged at an angle to the electronics portion 113, thereby favoring a compact construction of the housing 108.

Provided on the top side of the housing 108 are three fastening openings 108o, which serve to fasten the housing 108 to the carrier element 102 with the aid of suitable fastening elements.

The shape of the housing 108 designed to take up as little volume as possible and at the same time to allow favorable positioning of the operating component 130 on the handlebar 20.

The operating component 130 illustrated in different views in FIGS. 10a-10d comprises two bearing portions 136, through each of which a through-opening 136o passes, which define the position of the operating axis B, a first actuating portion 137 ("first paddle") and a second actuating portion 139 ("second paddle").

The first actuating portion 137 has a first thumb engagement surface 131 and a second thumb engagement surface 132, which are designed, when actuated properly by the operator's thumb, to deflect the operating component 130 in opposite directions of rotation out of the neutral position.

Specifically, when the first thumb engagement surface 131 is actuated by being pressed by the operator's (right) thumb, the operating component 130 is deflected in the first direction of rotation R1 in order to actuate the first switch 112, and when the second thumb engagement surface 132 is actuated by being pressed by the operator's (right) thumb, the operating component 130 is deflected in the second direction of rotation R2 in order to actuate the second switch 114.

The two thumb engagement surfaces 131 and 132 in this case form, with a shelf 134 arranged between the two engagement surfaces, a scoop-like depression 138 for the operator's thumb (cf. FIG. 10d). The two thumb engagement surfaces 131, 132 extend at an angle of around 80 to 120 degrees to one another, preferably at an angle of around 90 degrees.

The second actuating portion 139 has a finger engagement surface 133 formed in a convex manner, which is configured to be operated by the operator's index finger bend, thereby allowing quick actuation while maintaining the grip of the other fingers around the handlebar 20 as much as possible.

At the engagement surfaces 131, 132 and 133, it is possible (in contrast to what is illustrated) for surface structuring or a relief-like pattern to be provided in each case, in order to reduce the risk of the operator's particular finger slipping.

On account of the modular design of the bicycle operating apparatus, the operating component 130 may be provided in an exchangeable manner on the carrier element 102, such that the operating component can be adapted ergonomically and/or haptically to the rider's wishes. The (screw) connection provided in the present case between the carrier element 102 and operating component 130 with the pivot pin 150 allows quick and easy fitting. In particular, it is possible to provide a kit for a bicycle operating apparatus according to the present disclosure having a plurality of exchangeable operating components that differ in terms of shape and/or surface.

On that side of the operating component 130 that faces the housing 108 in the fitted state, two switch actuating surfaces 142 and 144 are provided at an angle of between 80° and 100°, preferably around 90°, to one another, said switch actuating surfaces 142 and 144 being configured to actuate the switches 112 and 114, respectively, by pressure (cf. FIG. 10b). The switch actuating surfaces 142, 144 are each surrounded by a spring plate 146, on which one end of a spring (for example of the spring element 113 in FIG. 5a) is supported in the fitted state, which is supported on the particular switch module and/or housing at the other end in each case, in order to preload the operating component 130 into the neutral position.

The spring plates 146 each have an elevation, which, after maximum permissible deflection out of the neutral position, butts against an immovable part of the switch 112, 114 to be actuated in each case, in order to prevent mechanical overloading of the respective switch.

FIGS. 11a-11c illustrates, in different perspective views, a further exemplary embodiment of a bicycle operating apparatus 200 according to the present disclosure, which is primarily described in more detail only inasmuch as it differs from the first exemplary embodiment. Otherwise, reference is made to the above description of the first exemplary embodiment.

Features of the second exemplary embodiment that correspond to those of the first exemplary embodiment are provided with reference signs that are based on the reference signs of the corresponding features of the first exemplary embodiment increased by 100. Where letters are used as or in reference signs, the same letters are used in each case for corresponding features of both exemplary embodiments.

In the second exemplary embodiment, the operating axis B extends obliquely both respect to the lower outer surface 220 of the housing 208 and to the lateral outer surface 225 of the housing 208, which is arranged perpendicularly to the lower outer surface 220.

In the present example, adjustment of the seat post 23 of the bicycle 10 is controlled using the left-hand bicycle operating apparatus 200 according to the second exemplary embodiment. Therefore, only a single switch (not visible in FIGS. 11a-11c) is provided on the bicycle operating apparatus 200, and the shape of the operating component 230 is modified accordingly and has only a single thumb engagement surface 231 as engagement surface.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle operating apparatus for wirelessly controlling at least one component of a bicycle, comprising:
   a carrier element on which a fastening device configured to fix the bicycle operating apparatus to a handlebar of the bicycle is attachable, the handlebar having a handlebar axis;
   a housing, attached to the carrier element, the housing having an energy storage compartment for receiving an energy storage element, the housing having an electronic circuit arrangement in the housing, wherein at least one switch connected to the electronic circuit arrangement is provided on the housing, and wherein the housing has at least one flat outer surface, which forms a lower or upper outer surface when the bicycle operating apparatus is in a state fitted properly on the handlebar, the at least one flat outer surface has a longitudinal axis extending in a skew manner and obliquely with respect to the handlebar axis when the bicycle operating apparatus is in a state fitted on the handlebar; and
   an operating component mounted on the carrier element pivotable about an operating axis and preloaded into a neutral position, the operating component deflectable out of the neutral position in a first direction of rotation about the operating axis in order to actuate the switch, wherein the operating axis extends obliquely with respect to the flat outer surface,
   wherein the at least one flat outer surface of the housing includes two flat outer surfaces that are substantially perpendicular to one another, the operating axis extending obliquely with respect to the two flat outer surfaces.

2. The bicycle operating apparatus of claim 1, wherein the lower or upper outer surface is part of a removable housing cover.

3. The bicycle operating apparatus of claim 2, wherein the longitudinal axis extends in a skew manner and obliquely with respect to the operating axis.

4. The bicycle operating apparatus of claim 1, wherein a clamp is the fastening device on the carrier element, the clamp defining a clamp axis oriented parallel to the operating axis, wherein the longitudinal axis extends in a skew manner and obliquely with respect to the clamp axis.

5. The bicycle operating apparatus of claim 4, wherein the operating axis extends parallel to and at a distance from the clamp axis, and wherein the housing is located entirely on a side of an operating axis plane that is remote from the clamp axis, the operating axis plane containing the operating axis and extending perpendicularly to a plane defined by the operating axis and the clamp axis.

6. The bicycle operating apparatus of claim 1, wherein the housing has an electronics portion and a switch portion, wherein the energy storage element and the electronic circuit arrangement are accommodated in the electronics portion, and the at least one switch is provided on or in the switch portion, the electronics portion has two outer surface portions arranged perpendicularly to one another.

7. The bicycle operating apparatus of claim 6, wherein the switch portion has two outer surface portions arranged perpendicularly to one another.

8. The bicycle operating apparatus of claim 7, wherein and the two outer surface portions of the switch portion extend obliquely with respect to the two outer surface portions of the electronics portion.

9. The bicycle operating apparatus of claim 8, wherein a further switch is provided on the housing, the further switch being connected to the electronic circuit arrangement, and wherein the operating component is deflected out of the neutral position in a second direction of rotation, which is opposite to the first direction of rotation, about the operating axis in order to actuate the further switch.

10. The bicycle operating apparatus of claim 9, wherein the operating component has at least two thumb engagement surfaces and at least one finger engagement surface, wherein the two thumb engagement surfaces are designed to deflect the operating component out of the neutral position in opposite directions of rotation.

11. The bicycle operating apparatus of claim 10, wherein the two thumb engagement surfaces form parts of a scoop-like depression.

12. The bicycle operating apparatus of claim 11, wherein the finger engagement surface is convexly curved perpendicularly to the operating axis.

13. The bicycle operating apparatus of claim 1, wherein a linear guide is provided on the carrier element and the fastening device is attachable to the linear guide to be adjustable in different fastening positions that lie on a guiding line, which extends parallel to the operating axis and/or a clamp axis.

14. The bicycle operating apparatus of claim 1, wherein an orthogonal projection of the operating axis onto a lower flat outer surface of the housing intersects a longitudinal center axis of the lower flat outer surface at an angle $\alpha$ of between 20° and 45°.

15. The bicycle operating apparatus of claim 1, wherein an orthogonal projection of the operating axis onto a lower flat outer surface of the housing intersects a longitudinal center axis of the lower flat outer surface at an angle $\alpha$ of between 25° and 35°.

16. The bicycle operating apparatus of claim 1, wherein an orthogonal projection of the operating axis onto the lower or upper outer surface of the housing intersects a longitudinal center axis of a lower flat outer surface at an angle $\alpha$ of 30°.

17. The bicycle operating apparatus of claim 1, wherein an orthogonal projection of the operating axis onto a lateral flat outer surface of the housing that extends perpendicularly to the lower or upper outer surface intersects a longitudinal center axis of the lateral outer surface that extends perpendicularly to a lower flat outer surface at an angle $\beta$ of between 20° and 45°.

18. The bicycle operating apparatus of claim 1, wherein an orthogonal projection of the operating axis onto a lateral flat outer surface of the housing that extends perpendicularly to the lower or upper outer surface intersects a longitudinal center axis of the lateral outer surface that extends perpendicularly to a lower flat outer surface at an angle $\beta$ of between 25° and 35°.

19. The bicycle operating apparatus of claim 1, wherein an orthogonal projection of the operating axis onto a lateral flat outer surface of the housing that extends perpendicularly to the lower or upper outer surface intersects a longitudinal center axis of the lateral outer surface that extends perpendicularly to a lower flat outer surface at an angle $\beta$ of 30°.

* * * * *